3,786,107
METHOD OF PRODUCING ALKYL AROMATICS
Hiroshi Kuribayashi and Takehiko Takeda, Yokohama, Yoshio Okada, Iwaki, and Takashi Yamauchi, Tokyo, Japan, assignors to Japan Gasoline Co., Ltd., and Kureha Kagaku Kogyo Kabushiki Kaisha, both of Tokyo, Japan
No Drawing. Filed Sept. 27, 1972, Ser. No. 292,773
Claims priority, application Japan, Oct. 2, 1971, 46/77,244
Int. Cl. C07c 3/62
U.S. Cl. 260—672 T          8 Claims

ABSTRACT OF THE DISCLOSURE

An improvement in the method of producing alkyl aromatic distillates having the boiling point in the range of 230–360° C. and the mean mol number of added olefin in the range of 1–3, which comprises the step of bringing an aromatic distillate other than the above defined alkyl aromatic distillates into contact with a solid acid catalyst not containing any halogenide in the presence or without the presence of olefin having 2–4 carbon atoms while applying such a pressure as being sufficient for retaining the liquid phase of said distillate other than the above defined alkyl aromatic distillates and a temperature in the range of 150–450° C. for a residence time of 0.5 to 10 hours.

BACKGROUND OF THE INVENTION

(a) Field of the invention

The present invention relates to a method of converting a heavy aromatic distillate arising from the petroleum refining industry, petrochemical industry and coal-chemical industry into useful products. More particularly, the present inventtion provides a method for producing alkyl aromatic distillates having the boiling points ranging from more than 230° C. to less than 360° C. and the mol number of added olefin in the range of 1–3 in a high yield.

(b) Description of the prior art

Prior methods of producing distillates of heavy alkyl-aromatic hydrocarbons include a method of extracting them from straight-run petroleums and a method of alkylating those heavy aromatic compounds which are substantially simple compounds. However, the first method is inevitably expense, and moreover, the extracted aromatic distillate is so complicated in chemical structure and contaminated with undesirable materials that it is inferior in quality for the purpose of serving as a heat transfer medium, insulating oil, solvent or the like. As to the latter method, it includes the known method of alkylating a pure aromatic hydrocarbon such as naphthalene in the presence of anhydrous aluminum chloride. However, this method aims to produce the alkylated product in the form of a nearly pure material, and accordingly, it should be clearly distinguished from the art wherein a distillate containing various compounds is used as a raw material and an alkylated product is produced therefrom by retaining the initial form of a mixture and utilized. The method according to the present invention fundamentally aims at socalled chemistry of heavy aromatic mixtures, and its technique is completely different from that in chemistry dealing with isolated or practically isolated chemical compounds such as being relatively simple in structures or relatively light in boiling points.

For instance, the specification of British Pat. No. 1,209,495 discloses a process wherein an aromatic compound such as naphthalene is alkylated, and an appropriate distillate resulting therefrom is used in the alkylation or transalkylation of naphthalene with aluminum chloride at a temperature below 52° C. to thereby obtain an alkylated material, such as 2,6-diisopropylnaphthalene, in the highest possible purity. Further, the specification of Japanese patent publication No. 21,769/1965 discloses a process wherein oil containing aromatic hydrocarbons having dry points of less than 259° C. (the boiling point of ethyl naphthalene) is used as the raw material, alkyl groups contained in said raw material are transferred to hydrocarbons having a boiling point of more than 218° C. (the boiling point of naphthalene), and the thus transferred alkyl groups are further transferred to hydrocarbons having a boiling point of less than 159° C. (the boiling point of n-propylbenzene). However, the invention according to said Japanese patent publication No. 21,769/1965 is different from the present invention in that, the boiling points of the raw material for providing alkyl groups are less than 250° C., the raw material which has already given the alkyl groups is clearly distinguished from the product and the boiling points of aromatic compound to receive the alkyl groups is more than 218° C. In other words this prior process (No. 21,769/65) is concerned with transalkylation between monocyclic compounds and polycyclic compounds, while transalkylation in the present invention occurs between polycyclic compounds.

Furthermore, the former is different from the latter in that the aromatic hydrocarbons receiving the alkyl groups at the next step are limited to a boiling point of less than 159° C.

SUMMARY OF THE INVENTION

The applicable raw material to be alkylated in the method according to the present invention is at least one distillate or oil selected from the group consisting of (1) heavy aromatic hydrocarbons, (2) unreacted heavy aromatic hydrocarbons recovered after olefin is reacted with the aforesaid heavy aromatic hydrocarbons (i.e. unreacted heavy aromatic hydrocarbon oils), and (3) alkyl aromatic distillates to which olefin has been added, said heavy aromatic hydrocarbons having boiling points of more than 180° C. respectively. These heavy aromatic hydrocarbons can be industrially obtainable from the plants producing olefins and acetylene by pyrolysis of petroleum. That is, they can be obtained from a distillate mainly containing heavy aromatic compounds which have undergone heat hysteresis at a temperature of more than 700° C. Furthermore, they are produced from distillates mainly containing heavy aromatic compounds which have undergone catalytic hysteresis at a temperature of more than 400° C., such as by-product heavy oils obtained from catalytic reforming of naphtha, light stock obtained from catalytic cracking of gas oils, by-product heavy oils obtained through catalytic or thermal-dealkylation process of alkyl aromatic distillates and the like. The most preferable heavy aromatic stock is a distillate mainly containing heavy aromatic compounds belonging to the by-product heavy oils obtained from catalytic reforming. And a heavy aromatic oil obtained as the by-product from the production of benzene by dealkylation of toluene, etc., is also preferable.

These heavy aromatic oils have hitherto been used mostly as fuel, and therefore, development of an effective use of these heavy aromatic oils is one of the characteristics of the present invention.

According to the method of the present invention, these heavy aromatic oils subjected to the process of promoting their thermal stability, for instance, oils subjected to selective hydrogenation at low temperature, followed by hydrotreatment at a temperature higher than the hydrogenation temperature, or oils subjected to the extraction process to promote their aromaticity, are also applicable as starting materials to be alkylated.

Moreover, according to the method of the present invention, among the residues remaining after distillation of alkyl aromatic hydrocarbons having a boiling point ranging from more than 230° C. to less than 360° C. from the foregoing heavy aromatic oils, or said oils after treatment with hydrogen, employed as the starting material and reacted with olefin, (1) a pre-distillate having a boiling point of more than 180° C. and being insufficient in mol number of added olefin required for the intended product (i.e., the underalkylated by-products of olefin-aromatic oil alkylation), (2) a post-distillate having a boiling point of more than 180° C. and the mol number of added olefin more than reqired for the intended product, (3) a mixture of said pre-distillate and post-distillate, (4) a mixture of said post-distillate and a heavy aromatic oil not alkylated with olefin and having a boiling point of more than 180° C., and (5) a mixture of said pre-distillate and post-distillate and heavy aromatic stock having boiling points of more than 180° C. and not alkylated with olefin are also applicable as the raw material.

The distillate having boiling points in the range of from more than 230° C. to less than 360° C. is prepared by treating the aforesaid raw material in the presence or without the presence of olefin having 2 to 4 carbon atoms by the use of a solid acid catalyst of silica-alumina or crystalline alumino-silicate not containing any halogenide at a temperature in the range of 150–450° C. under a pressure sufficient for retaining the liquid phase of the material for the residence time of liquid in the range of 0.5–10 hours. In this connection, the mixing ratio of said pre-distillate to post-distillate having their boiling points of more than 180° C., the mixing ratio of said non-alkylated heavy aromatic oil having a boiling point of more than 180° C. to said post-distillate, and the mixing ratio of said heavy aromatic oil having boiling points of more than 180° C. to said post-distillate may be varied according to the kind of intended product. As to the solid acid catalyst of silica-alumina series containing no halogenide, any particular denaturation is not required, but such silica-alumina catalysts mixed with some percents of metal oxides, for instance, Ni oxide, Co oxide, Fe oxide, Ag oxide, etc., are also effective. The most practically preferable solid acid catalyst is a silica-alumina catalyst of which the surface area is more than 500 m.$^2$/gr., the pore volume of more than 75 A. is more than 0.1 cc./gr., and the content of $Al_2O_3$ is in the range of 12–25% by weight. In the case of the crystalline alumino-silicate catalyst, zeolites of X-, Y- or Z-type are effective. Especially suitable zeolite is of Y-type wherein the ion exchanging cation is a rare earth metallic ion or hydrogen ion as calcined at a temperature in the range of 500–800° C. Furthermore, it is preferable that said olefin having 2–4 carbon atoms, such as ethylene, propylene and butylenes, is present in the reaction system. Besides, in case said solid acid catalyst is applied to the alkylation process, the reaction may be effected by means of one and the same reactor without installing any separate reactor in addition to the alkylation reactor. The reaction which seems to occur in the process according to the present invention is a shifting reaction of alkyl groups. This shifting reaction comprises the transalkylation, disproportionation, and isomerization based on intermolecular shift of alkyl groups. By virtue of this reaction, equalization of the number of alkyl groups is effected between the portion having a high boiling point, that is, the portion to which a lot of alkyl groups have been added i.e. overalkylated, and the portion having a low boiling point, that is the portion to which a few or none of alkyl groups have been added i.e. underalkylated, and as a result, the desirable product according to the present invention having a boiling point in the range of from more than 230° C. to less than 360° C. and the mol number of added olefin in the range of 1–3 is efficiently produced.

Meanwhile, the inventors of the present invention have found that concurrence of another reaction, which they have never expected before, with the foregoing conceivable reaction contributes to promoting the quality of the products. It is indeed worthy of note that the product according to the present invention shows more excellent solubility than a product obtained through reaction of the aforesaid heavy aromatic distillate with olefin particularly in case of employing it as a solvent. The reason for this is yet to be clarified, but it seems that the product obtained by the method of the present invention gives rise to dealkylation reaction to a little degree and, on this occasion, hydrogen is taken out of the partially hydrogenated aromatic hydrocarbons in the material. Consequently, it is thought that the fully hydrogenated aromatics disappear, the aromaticity of the material is enhanced, and its solubility for resins, dye stuffs and other substances is increased. The occurrence of a dehydrogenating dealkylation reaction is inferable from the fact that olefin is not practically present in the by-product gas and there is present only paraffinic light hydrocarbons. The occurrence of decomposition reaction entailing the lightening of material is also conceivable. However, the extent of this decomposition can be controlled by application of the chosen conditions according to the present invention, namely, the employment of a silica-alumina catalyst or solid acid catalyst of crystalline alumino-silicate series free of halogenide at a temperature in the range of 150–450° C. and under such pressure as being sufficient for retaining the liquid phase of the material in particular.

It is further conceivable that, according to the method of the present invention, occurrence of the condensation reaction therein brings about polymerization of unstable materials, resulting in the effect of making the product heavier than the range of boiling point of distillate and preventing such unstable materials from entering the product. Meanwhile, in the distillate lighter than the distillate to be finally produced—especially in the by-product aromatic distillate having no alkyl group, the concentration of practically hydrogenated aromatics (tetralin) rises higher than the concentration of tetralin contained in the raw material. In other words, the alkylated tetralin is transferred into the light distillate having a boiling point lower than that of the product distillate, and this also exerts a favorable influence upon the quality of the product indirectly.

As discussed in the foregoing, the method according to the present invention not only evens the boiling points by the shift of alkyl groups but also gives rise to various reactions among various compounds, and the synergetic effect of these reactions results in unexpected effects in respect of not only the yield of product but also the quality thereof. These unexpected effects are intrinsic merits of the present invention aiming at chemistry of mixtures.

The above described distillate produced by the method under the present invention which has the boiling point in the range of from more than 230° C. to less than 360° C. and the mol number of added olefin in the range of 1–3 has displayed excellent performances when served as the heat transfer medium, solvent, plasticizer and lubricant.

DESCRIPTION OF THE PREFERRED EMBODIMENTS

EXAMPLE 1

A heavy aromatic stock obtained through the process of recovering light aromatic materials such as benzene from an oily fraction produced as the by-product at the time of producing ethylene by the pyrolysis of naphtha and then removing an excessively heavy distillate from the residue, was used as the starting material.

The properties of said heavy aromatic stock were as follows:

density $d_4^{15}$: 0.9654
sulfur-containing compounds (as S): 120 p.p.m.
basic nitrogen-containing compounds (as N): 2.1 p.p.m.
bromine value: 44.5
diene value: 7.1
distilling state:
    IBP: 172° C.
    10%-distilling point: 212° C.
    50%-distilling point: 235° C.
    90%-distilling point: 314° C.

This heavy oil was introduced into a reactor at the rate of 3.0 kg./hr. and subjected to low-temperature hydrogenation under the pressure of 45 kg./cm.$^2$ G by applying hydrogen at the rate of 1.5 Nm.$^3$/hr. 2.0 l. of a catalyst prepared by previously reducing Ni catalyst, partially poisoning the reduced catalyst and processing it so as to leave the hydrogenation ability of diolefin, was charged in the reactor for said low-temperature hydrogenation. The inlet temperature was 130° C., but the outlet temperature was 155° C., indicating the occurrence of hydrogenation exothermic reaction of diolefin within the reactor. On the other hand, high-temperature hydrotreating was conducted by means of a reactor charged with a catalyst containing Ni, Co and Mo supported by an alumina carrier, which catalyst have been previously treated with hydrogen sulfite. The reaction conditions were as follows: application of hydrogen at the rate of 1.5 Nm.$^3$/hr. to 2.0 kg. of heavy oil hydrogenated at low temperature; 5 hours in liquid residence time; and 40 kg./cm.$^2$ G in total pressure. The inlet temperature was 380° C., and the outlet temperature was 400° C.

The properties of the thus purified heavy oil were as follows:

density $d_4^{15}$: 0.9519
sulfur-containing compounds (as S): 12 p.p.m.
basic nitrogen-containing compounds: less than 0.05 p.p.m. (as N)
bromine value: less than 3
diene value: less than 0.05
distilling state:
    IBP: 172° C.
    10%-distilling point: 212° C.
    50%-distilling point: 225° C.
    90%-distilling point: 280° C.

This purified heavy oil was reacted with propylene. The catalyst employed was SiO$_2$–Al$_2$O$_3$ catalyst containing 13% of Al$_2$O$_3$ which was previously kilned at 600° C., and said catalyst had been molded in 3 mm. $\phi$ pellet for use. The surface area of the catalyst was 500 m.$^2$/gr. and the volume of pore with more than 75 A. was 0.01 cc./gr.

The reaction conditions were as follows:

feed rate of purified heavy oil: 2.0 kg./hr.
feed rate of propylene: 0.5 Nm.$^3$/hr.
inlet temperature: 150° C.
outlet temperature: 320° C.
quantity of catalyst: 2.0 l.

The purity of the propylene employed was about 95%, and the majority of the impurities was propane.

The properties of an oily product obtained through reaction with olefin were as follows:

density $d_4^{15}$: 0.9324
distilling state:
    IBP: 172° C.
    10%-distilling point: 243° C.
    50%-distilling point: 305° C.
    90%-distilling point: 380° C.

From this oily product, a distillate having the boiling point of 250–280° C. (the mean mol number of added propylene: 1), a distillate having the boiling point of 280–320° C. (the mean mol number of added propylene: 2) and a distillate having the boiling point of 320–350° C. (the mean mol number of added propylene: 3) were separated respectively. And, the predistillates having having the boiling point of more than 180° C. to less than 250° C. (the mean mol number of added propylene: less than 1) and the post-distillates having the boiling point of more than 350° C. (the mean mol number of added propylene: more than 3) other than those distillates separated as above were used as the raw materials in the present invention. As the solid acid catalyst, SiO$_2$–Al$_2$O$_3$ catalyst containing 13% of Al$_2$O$_3$ previously kilned at 600° C. and molded into 3 mm$\phi$ pellet was charged in a reactor. By means of this reactor, reaction was effected in the presence of hydrogen by applying the following conditions. In this connection, the surface area of the catalyst was 500 m.$^2$ gr. and the volume of pore with more than 75 A. was 0.1 cc./gr.

feed rate of light distillate having boiling point of less than 250° C.: 1.0 kg./hr.
feed rate of heavy distillate having boiling point of more than 350° C.: 2.5 kg./hr.
(molar ratio =1:1)

reaction temperature: 250° C.
outlet pressure: 10 kg./cm.$^2$ G
quantity of catalyst: 3.0 l.

The density properties of the reaction product were as follows:

denity $d_4^{15}$: 0.9320
distilling state:
    IBP: 170° C.
    10%-distilling point: 240° C.
    50%-distilling point: 305° C.
    90%-distilling point: 388° C.

From this reaction product, a distillate having the boiling point of 250–280° C. (the mean mol number of added propylene: 1), a distillate having the boiling point of 280–320° C. (the mean mol number of added propylene: 2) and a distillate having the boiling point of 320–350° C. (the mean mol number of added propylene: 3) were separated respectively. The total quantity of these three distillates was about 55% of the reaction product. The thus obtained three distillates were tested as the products respectively. The results were as follows:

(1) Distillate as cut by the range of 250–280° C.:
    mean molecular weight: 180
    mean boiling point: 268° C.
    fluid point: <—50° C.
    flash point: 120° C.
    density: (15° C.) 0.96 g./cm.$^3$
    specific heat: (268° C.) 0.6 Kcal./kg.° C.

This distillate proved servable as an excellent heat transfer medium having a satisfactory heat stability and fluidity at low temperature.

(2) Distillate as cut by the range of 280–320° C:
    mean molecular weight: 210
    mean boiling point: 295° C.
    fluid point: <—40° C.
    flash point: 145° C.
    density: (15° C.) 0.96 g./cm.$^3$
    specific heat: (323° C.) 0.65 Kcal./kg.° C.

This distillate proved servable not only as an excellent heat transfer medium alike the distillate (1) above, but also as an electrically insulating oil and a special solvent. An example of the special characteristics of this distillate was as follows:

evaporation loss (at 98° C., for 5 hours): 0.18%
acid value: 0.004 mg. KOH/g.
dielectric characteristics (at 80° C.):
   $\epsilon$: 2.42
   tan $\delta$ (percent): 0.006
   $\rho$ ($\Omega$ cm.): $1.5 \times 10^{16}$
   puncture voltage (k.v./mn.): A·C 15
                                     impulse 127

(3) Distillate as cut by the range of 320–350° C.:
   mean molecular weight: 250
   mean boiling point: 323° C.
   fluid point: $<-30°$ C.
   flash point: 165° C.
   density: (15° C.) 0.96 g./cm.$^3$
   specific heat: (323° C.) 0.65 Kcal./kg.° C.

This distillate proved servable as an excellent liquid-phase heat transfer medium because of its superb heat stability. Besides, it also proved to have excellent electric characteristics as shown in the following:

evaporation loss (at 98° C., for 5 hours): 0.1%
acid value: 0.11 mg. KOH/g.
sludge (at 120° C.; after 75 hours' treatment): 0.02%
dielectric characteristics:

|  | 80° C. | 10° C. | 120° C. |
|---|---|---|---|
| $\epsilon$ | 2.45 | 2.40 | 2.30 |
| Tan $\delta$ (percent) | 0.024 | 0.052 | 0.080 |
| $\rho$ ($\Lambda$ cm.) | $9.5 \times 10^{15}$ | $5.1 \times 10^{15}$ | $1.7 \times 10^{15}$ |

EXAMPLE 2

1 part (by weight) of the purified heavy oil produced in Example 1, 1 part (by weight) of the pre-distillate having the boiling point of from more than 180° C. to less than 250° C. (the mean mol number of added propylene: less than 1) separated from the propylated reaction product and 1 part (by weight) of the post-distillate having the boiling point of more than 350° C. (the mean mol number of added propylene: more than 3) separated from said propylated reaction product were mixed to serve as the raw material. By the use of this raw material, reaction was effected under the following conditions in the presence of propylene within an alkylation reactor charged with a catalyst prepared by molding H-Y type zeolite kilned at 550° C. into 3 mm$\phi$ pellet form.

feed of raw material: 4 kg./hr.
reaction temperature: 225–270° C.
outlet pressure: 5.0 kg./cm.$^2$G
quantity of catalyst: 8 l.
feed of propylene: 300 Nl/hr.

The quantity of the distillate having the boiling point in the range of 260–330° C. (the mean mol number of added propylene: 2) contained in the reaction product was 60%.

EXAMPLE 3

A heavy fraction obtained as a by-product at the time of producing gasoline through catalytic reforming of naphtha was reacted with propylene, and the resulting distillate served as the raw material was treated by the method under the present invention.

The properties of the heavy fraction were as follows:

density $d_4^{15}$: 1.0036
sulfur-containing compounds (as S): 70 p.p.m.
basic nitrogen-containing compounds (as N): 12 p.p.m.
distilling state:
   IBP: 215° C.
   10%-distilling point: 235° C.
   50%-distilling point: 270° C.
   90%-distilling point: 293° C.

The conditions for reacting this heavy fraction with propylene were as follows:

feed rate of heavy fraction: 2.0 t./hr.
feed rate of propylene: 300 Nm.$^3$/hr.
inlet temperature: 200° C.
maximum temperature: 320° C.
outlet pressure: 5 kg./cm.$^2$G
quantity of catalyst: 6.3 m.$^3$ 4 reactors, 20 inches in diameter and 10 m. in length each, were joined in series while disposing a cooler among them. The catalyst applied was the same as that employed for reacting propylene in Example 1 except that it was kilned at 550° C.

After fractionating a distillate having the boiling point of 260–330° C. (the mean mol number of added propylene: 1.7) as a product from an oily material obtained through reaction of propylene, a lighter distillate having the boiling point of 180–280° C. (the mean mol number of added propylene: 0.2) and a heavier distillate having the boiling point of 320–EP (the mean mol number of added propylene: 2.8) were obtained from the residue and mixed with each other to be about equivalent in mol to serve as the raw material.

This mixture was reacted with SiO$_2$-Al$_2$O$_3$ catalyst containing 13% of Al$_2$O$_3$ as previously kilned at 550° C. and molded into 3 mm$\phi$ cylindrical form, of which the surface area was 500 m.$^2$/gr. and the volume of pore with more than 75 A. was 0.1 cc./gr. in the presence of propylene. The reaction conditions were as follows:

feed rate of raw material: 20 t./hr.
feed rate of propylene: 100 Nm.$^3$/hr.
inlet temperature: 230° C.
maximum temperature: 250° C.
outlet pressure: 10 kg./cm.$^2$G The quantity of the distillate having the boiling point in the range of 260–330° C. (the mean mol number of added propylene: 1.8) contained in the reaction product was about 30%.

EXAMPLE 4

A light distillate having the boiling point in the range of 280–310° C. (the mean mol number of added propylene: 1.1) and a heavy distillate having the boiling point in the range of 350–380° C. (the mean mol number of added propylene: 2.8) obtained after removing a distillate of IBP 310° C.–EP 340° C. (the mean mol number of added olefin: 2.0) by reacting propylene with a heavy oil produced as the by-product at the time of preparing benzene by subjecting a catalytically reformed naphtha to catalytic alkylation in the presence of hydrogen, were mixed to be about equivalent in mol to serve as the raw material. Reaction was effected by the use of SiO$_2$-Al$_2$O$_3$ catalyst under the following conditions.

feed rate of raw material: 20 kg./hr.
inlet temperature: 245° C.
outlet temperature: 240° C.
outlet pressure: 10 kg./cm.$^2$G
accompanying gas: hydrogen The quantities of distillates as cut by the range of boiling point in the reaction product were as follows:

|  | Percent |
|---|---|
| Distillate in the range of IBP–280° C. (mean mol number of added olefin: 0.2) | 30 |
| Distillate in the range of 280–310° C. (mean mol number of added propylene: 1.1) | 20 |
| Distillate in the range of 310–340° C. (mean mol number of added propylene: 2) | 15 |
| Distillate in the range of 340–370° C. (mean mol number of added propylene: 2.7) | 10 |
| Distillate in the range of 370–EP (mean mol number of added propylene: more than 3) | 25 |

EXAMPLE 5

Syria crude oil was decomposed with steam at 2,000° C. to obtain acetylene and ethylene. After recovering benzene and further removing dregs from the residue, the heavy by-product distillate was subjected to reaction with propylene. The resulting light distillates having one propyl group on the average per aromatic ring added thereto (the range of boiling point: 280–310° C.) and heavy distillates having three propyl groups on the average per aromatic ring added thereto (the range of boiling point: 350–380° C.) were served as the raw material and subjected to treatment in an autoclave under the following conditions:

temperature: 300° C., pressure: 10 kg./cm.$^2$G, reaction time: 3 hours, 10 parts by volume of material per 1 part by volume of catalyst, nitrogenic atmosphere, catalyst: silica-alumina-1 (low-alumina), silica-alumina-2 (high-alumina), zeolite-1 (Y-type zeolite substituted by lanthanum ion) or zeolite-2 (Y-type zeolite substituted by hydrogen ion).

The ranges of boiling point of the thus obtained distillates as classified by the kind of catalyst applied were as follows:

| | ~250° C. | 250–280° C. | 280–320° C. | 320–350° C. | 350° C.~ |
|---|---|---|---|---|---|
| Liquid composition of raw material (percent by weight) | 0.09 | 33.37 | 16.85 | 45.55 | 1.13 |
| Mean mol of added olefin | >1 | 1 | 2 | 3 | <3 |
| Product classified by the kind of catalyst applied | | | | | |
| Silica-alumina-1 | 9.67 | 23.51 | 41.50 | 27.20 | 3.11 |
| Silica-alumina-2 | 7.47 | 25.62 | 39.40 | 21.36 | 4.15 |
| Zeolite-1 | 7.33 | 25.25 | 36.27 | 28.74 | 2.42 |
| Zeolite-2 | 9.59 | 21.37 | 43.54 | 20.47 | 5.04 |

The distillate having the boiling point of 280–320° C. obtained through this reaction is servable as a special solvent. And the propylated substance having the boiling point of 280–320° C. to be obtained at the time of producing the present raw material has the same use as above. That is, this distillate has proved excellent in solubility as well as color developability against dye stuffs such as CVL (Crystal Violet Lactone) and BLMB (Benzoyl Leuco Methylene Blue).

EXAMPLE 6

A raw material containing more than 60% by weight of monopropylated bicyclic aromatic hydrocarbon having the hereunder mentioned distilling properties was treated with silica-alumina catalyst under the conditions that the feed rate of raw material was 2.5 t./hr., the feed rate of nitrogen gas was 50 Nm.$^3$/hr., the reaction temperature was in the range of 266–296° C., the outlet pressure was 7 kg./cm.$^2$G and the quantity of catalyst applied was 4.7 m.$^3$.

| | Raw material | Product |
|---|---|---|
| IBP, ° C | 252 | 205 |
| 20%-distilling point | 256 | 255 |
| 40%-distilling point | 262 | 257 |
| 60%-distilling point | 267 | 270 |
| 80%-distilling point | 277 | 330 |
| EP distilling point | 286 | 338 |

Among the reaction products, the distillate having the boiling point of 280–320° C. (the mean mol number of added propylene: 2) proved suitable for use as a special solvent.

EXAMPLE 7

Among the products obtained by reacting ethylene with the residue after recovering a distillate having the boiling point of 200–215° C. by distillation of the refined oil resulting from high temperature hydrogenation as described in Example 1, a distillate having no added ethylene (the range of boiling point: 180–240° C.) and another distillate having about two mols of ethylene added thereto (the range of boiling point: 280–310° C.) were mixed at the molar ratio of 1 to 1. By employing this mixture as the raw material, reaction was effected in batch-wise operation by means of silica-alumina catalyst at the temperature of 420° C. for 5 hours. In the thus obtained reaction product, the distillate having the boiling point in the range of 240–280° C. (the mean mol number of added ethylene: 1) was 29%.

EXAMPLE 8

Among the products obtained by reacting butylene with the distillate having the boiling point of 200–215° C. mentioned in Example 7, a distillate having no added butylene (the range of boiling point: 190–250° C.) and another distillate having about two mols of butylene added thereto (the range of boiling point: 290–340° C.) were mixed at the molar ratio of 1 to 1. By employing this mixture as the raw material, reaction was effected in batch-wise operation by means of zeolite (H-Y type) catalyst at the temperature of 200° C. for 2 hours. In the thus obtained reaction product, the distillate having the boiling point in the range of 250–290° C. (the mean mol number of added butylene: 1) was 31%. This distillate displayed satisfactory performances when used as the solvent, plasticizer and heat transfer medium.

What is claimed is:

1. A method of producing useful alkyl aromatic distillate having a boiling point in the range of from more than 230° C. to less than 360° C. and a mean mol number of added olefin in the range of from 1 to 3, which comprises, producing an alkylated aromatic hydrocarbon reaction mixture by treating a member selected from the group consisting of
    (1) a distillate having a boiling point of more than 180° C. and having less than said mean mol number of added olefin,
    (2) a distillate having a boiling point of more than 180 C. and having more than said mean mol number of added olefin,
    (3) a mixture of (1) and (2),
    (4) a mixture of (2) and heavy non-alkylated aromatic hydrocarbon oil having a boiling point of more than 180° C.,
    (5) a mixture of (1), (2) and a heavy non-alkylated aromatic hyrocarbon oil having a boiling point of more than 180° C., with halogenide-free solid acid catalyst selected from the group consisting of silica-alumina and crystalline alumino-silicate, at a temperature in the range of from 150° C. to 450° C., under a pressure sufficient to maintain the materials in the liquid phase, for a residence time in the range of from 0.5 to 10 hours; and recovering from said reaction mixture an alkylated aromatic distillate having a boiling point of from 230° C. to 360° C.

2. A method as defined in claim 1, wherein said heavy non-alkylated aromatic hydrocarbon oil is selected from the group consisting of by-product heavy oil from catalytic reforming of naphtha, light cycle stock from catalytic cracking of gas oil and by-product heavy oil from catalytic or thermal dealkylation of alkyl aromatics.

3. A method as defined in claim 1, wherein the reaction is carried out in the presence of olefin having 2 to 4 carbon atoms.

4. A method as defined in claim 1, wherein the catalyst employed is a silica-alumina catalyst having a surface area of more than 500 m.$^2$/gr., the volume of pores of more than 75 A. is more than 0.01 cc./gr., and the content of $Al_2O_3$ is in the range of from 12 to 25% by weight.

5. A method as defined in claim 1, wherein the catalyst employed is zeolite of the Y-type having as the ion exchanging cation a rare earth metallic ion or hydrogen ion as calcined at a temperature in the range of from 500° C. to 800° C.

6. A method as defined in claim 3, wherein the olefin is selected from the group consisting of ethylene, propylene and butylene.

7. In a process for producing an alkylated aromatic heavy hydrocarbon product which comprises reacting an aromatic heavy stock with an olefin having 2 to 4 carbon atoms to produce an alkylated heavy aromatic having a mean number of alkyl groups per aromatic molecule in the range of 1 to 3, together with (1) an underalkylated by-product having less than said mean number of alkyl groups per aromatic molecule and having a boiling point above 180° C. and (2) an over-alkylated by-product having more than said mean number of alkyl groups per aromatic molecule and having a boiling point above 180° C., the improvement comprising:

utilizing as a starting material in a second reaction a member of the group consisting of (1); (2); (3) being a mixture of (1) with (2); (4) being a mixture of (2) with an unalkylated heavy aromatic oil having a boiling point above 180° C.; and (5) being a mixture of (1) with (2) and an unalkylated heavy aromatic oil having a boiling point above 180° C., contacting said starting material with a solid catalyst comprising silica-alumina or crystalline aluminosilicate free of halogenide at a temperature of 150° C. to 450° C. at a pressure sufficient to maintain the reaction mixture in the liquid phase for a period of time of 0.5 to 10 hours and recovering an alkylated aromatic hydrocarbon having 1 to 3 alkyl groups per aromatic ring from the reaction mixture.

8. A process according to claim 7, in which said starting material is also contacted with olefin having 2 to 4 carbon atoms.

References Cited

UNITED STATES PATENTS

| | | | |
|---|---|---|---|
| 3,249,645 | 5/1966 | Suld | 260—672 T |
| 3,574,720 | 4/1971 | De Vault | 208—141 |
| 3,597,491 | 8/1971 | Kovach et al. | 260—672 T |
| 3,663,428 | 5/1972 | Takahashi et al. | 260—671 P |

FOREIGN PATENTS

| | | | |
|---|---|---|---|
| 21,769 | 9/1965 | Japan | 260—672 T |

CURTIS R. DAVIS, Primary Examiner

U.S. Cl. X.R.

260—668 F, 671 P, 671 G